United States Patent
Takahashi

(10) Patent No.: US 9,906,763 B2
(45) Date of Patent: Feb. 27, 2018

(54) PROJECTION TYPE DISPLAY APPARATUS AND METHOD OF CONTROLLING THE SAME

(71) Applicant: NEC Display Solutions, Ltd., Tokyo (JP)

(72) Inventor: Mitsuru Takahashi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/315,331

(22) PCT Filed: Jun. 6, 2014

(86) PCT No.: PCT/JP2014/065046
§ 371 (c)(1),
(2) Date: Nov. 30, 2016

(87) PCT Pub. No.: WO2015/186238
PCT Pub. Date: Dec. 10, 2015

(65) Prior Publication Data
US 2017/0208306 A1  Jul. 20, 2017

(51) Int. Cl.
*H04N 9/31* (2006.01)
(52) U.S. Cl.
CPC ........... *H04N 9/3194* (2013.01); *H04N 9/312* (2013.01); *H04N 9/3155* (2013.01); *H04N 9/3161* (2013.01)
(58) Field of Classification Search
CPC G03B 21/02; G03B 21/2013; G03B 21/2033; G03B 21/2053; H04N 9/73; H04N 9/3155; H04N 9/3161
See application file for complete search history.

(56) References Cited

U.S. PATENT DOCUMENTS

| | | | | |
|---|---|---|---|---|
| 2008/0165815 A1* | 7/2008 | Kamijima | ............ | H04N 9/3161 372/34 |
| 2008/0246927 A1* | 10/2008 | Inoue | ..................... | G09G 3/002 353/85 |

(Continued)

FOREIGN PATENT DOCUMENTS

| JP | H 07-295098 A | 11/1995 |
|---|---|---|
| JP | 2005-229112 A | 8/2005 |

(Continued)

OTHER PUBLICATIONS

International Search Report (ISR) (PCT Form PCT/ISA/210), in PCT/JP2014/065046, dated Sep. 9, 2014.

*Primary Examiner* — Sultan Chowdhury
(74) *Attorney, Agent, or Firm* — McGinn IP Law Group, PLLC

(57) ABSTRACT

A projection type display apparatus includes: a semiconductor laser element that outputs laser light based on supply of current; a digital mirror device (DMD) that modulates the light output from the semiconductor laser element and emits the modulated light; a projection lens that projects the incident light via the DMD; a drive unit that drives the semiconductor laser element and includes a current detection unit for detecting the current value of the current flowing through the semiconductor laser element; and a controller that, when the current value detected by the current detection unit becomes greater than a first threshold, controls driving of the DMD so that the light output from the DMD will not be incident on the projection lens, and when the current value detected becomes greater than a second threshold greater than the first threshold, causes the drive unit to cut off the supply of current.

16 Claims, 2 Drawing Sheets

(56) References Cited

U.S. PATENT DOCUMENTS

| | | | | |
|---|---|---|---|---|
| 2010/0157253 A1* | 6/2010 | De Vaan | .............. | H04N 9/3129 353/69 |
| 2010/0328616 A1* | 12/2010 | Silverstein | ........... | H04N 9/3129 353/31 |
| 2013/0242266 A1* | 9/2013 | Hara | .................... | G03B 21/206 353/31 |
| 2013/0250251 A1* | 9/2013 | Kubota | .................. | G03B 21/14 353/57 |

FOREIGN PATENT DOCUMENTS

| | | |
|---|---|---|
| JP | 2007-517244 A1 | 6/2007 |
| JP | 2008-250242 A | 10/2008 |
| JP | 2008-299063 A | 12/2008 |
| JP | 2010-224316 A | 10/2010 |
| JP | 2011-227402 A | 11/2011 |
| JP | 2012-002871 A | 1/2012 |
| JP | 2012-084630 A | 4/2012 |
| JP | 2014-035856 A | 2/2014 |

* cited by examiner

PROJECTION TYPE DISPLAY APPARATUS AND METHOD OF CONTROLLING THE SAME

TECHNICAL FIELD

The present invention relates to a projection type display apparatus and controlling method thereof.

BACKGROUND ART

Some of recent projection type display apparatuses such as projectors that modulate light output from a light source to perform projection, use high-power semiconductor laser elements (LD: Laser Diode) as a light source.

In general, light output from the semiconductor laser element is controlled based on the driving current supplied to the semiconductor laser element. However, once an anomaly such as a malfunction of parts takes place in the driving device for supplying driving current to the semiconductor laser element, an excessive current beyond the rated operation range flows through the semiconductor laser element, hence there is the risk that a high-power density light will be emitted from the semiconductor laser element. Output (projection) of such high-power density light to the outside is not desirable in the above-described, projection type display apparatus using a semiconductor laser element as its light source.

For example, Patent Document 1 (JP2012-084630A) discloses a technology in which a switch provided between a driving device for supplying driving current to an LD and the LD, is controlled to turn on and off based on the current value of the driving current being detected. According to this technology, if the current value of the detected driving current becomes greater than a predetermined threshold, the driving current is determined to be excessive (excessive current), and the switch is turned off to cut off the connection between the driving device and the LD. Since no driving current is supplied to the LD by cutting the connection between the driving device and the LD, it is possible to prevent the LD from emitting high-power density light.

RELATED ART DOCUMENTS

Patent Documents

Patent Document 1: JP2012-084630A

SUMMARY

Problems to be Solved by the Invention

In the technology disclosed by Patent Document 1, when excessive current is detected, the switch is turned off to cut off the connection between the LD and the driving device. When the LD is cut off from the driving device, the circuit for supplying driving current to the LD remains in the open state, so that no driving current flows through the LD. In this case, it takes time to return the driving device and the semiconductor laser element to normal operating state, hence the suspended operating state continues for a certain period of time. For this reason, when, for example, excessive current is supplied to the semiconductor laser element due to temporal anomaly of the driving device, the LD is cut off from the driving device so that the suspended operating state is continued even after the anomaly of the driving device has been solved, resulting in a loss of convenience.

Further, usually a time delay occurs from the time when control is performed to turn off the switch until the switch is actually cut off. Accordingly, if excessive current flows within this duration of delayed time, a high-power density light (unnecessary light) attributed to excessive current may be output from the semiconductor laser element and given off to the outside of the projection type display apparatus.

On the other hand, when the driving current flowing through the LD is stopped without using a switch to cut off the current flow, in some cases it takes a long time to stably return the driving device and the semiconductor laser element to the normal operational state, in other cases a time delay occurs until the driving current stops.

The object of the present invention is to provide a driving device that can inhibit loss of convenience and/or prevent the output of unnecessary light to the outside of the apparatus, as well as to provide a method for controlling the driving device and to equip the driving device with a projection type display apparatus.

Means for Solving the Problems

In order to achieve the above object, an exemplary aspect of a projection type display apparatus of the present invention includes:

a laser light source that outputs laser light in accordance with the supply of current;

a modulation element that modulates light output from the laser light source and emits the modulated light;

a projection lens that projects incident light via the modulation element;

a drive unit that drives the laser light source and includes a current detection unit for detecting the current value of the current flowing through laser light source; and, a controller that, when the current value detected by the current detection unit becomes greater than a first threshold, controls driving of the modulation element so that the outgoing light from the modulation element will not be incident on the projection lens, and when the current value detected by the current detection unit becomes greater than a second threshold that is greater than the first threshold, causes the drive unit to cut off the supply of current to the laser light source.

In order to achieve the above object, an exemplary aspect of a method of controlling a projection type display apparatus of the present invention is effected in a projection type display apparatus including: a laser light source that outputs laser light in accordance with the supply of current; a modulation element that modulates light output from the laser light source and emits the modulated light; and a projection lens that projects incident light via the modulation element, and comprises the steps of:

detecting the current value of the current flowing through the laser light source;

controlling driving of the modulation element so that the outgoing light from the modulation element will not be incident on the projection lens when the current value detected by the current detection unit becomes greater than a first threshold; and, cutting off the supply of current to the laser light source when the current value detected by the current detection unit becomes greater than a second threshold that is greater than the first threshold.

Effect of the Invention

According to the present invention, it is possible to inhibit lowering of convenience and/or prevent the output of unnecessary light to the outside of the apparatus.

EXEMPLARY EMBODIMENT

Hereinbelow, mode for carrying out the present invention will be described with reference to the drawings.

Figure 1:
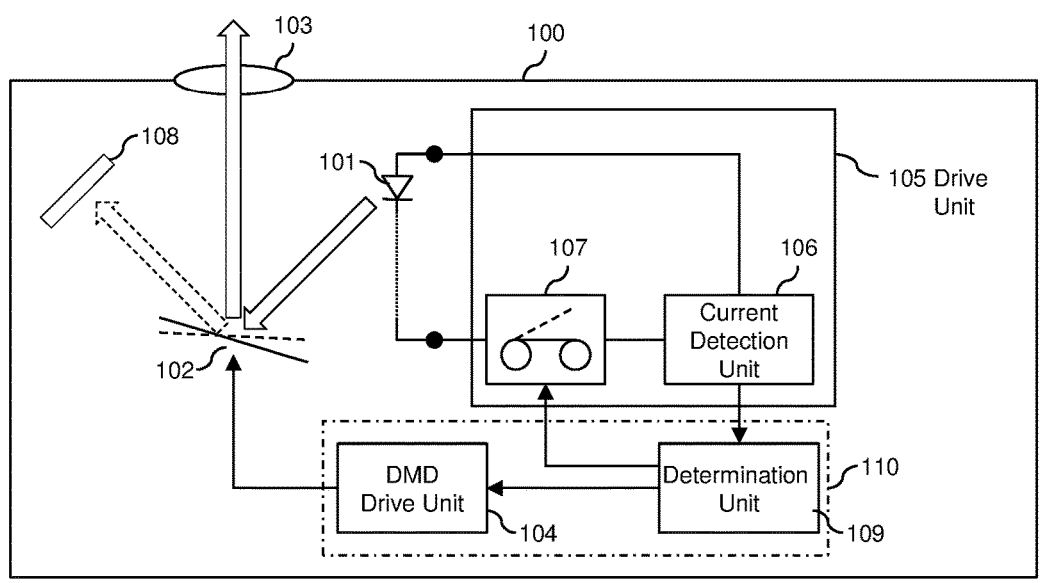
FIG. 1 is a block diagram showing essential components of a projection type display apparatus of one exemplary embodiment of the present invention.

FIG. 1 is a block diagram showing essential components of projection type display apparatus 100 of one exemplary embodiment of the present invention.

Projection type display apparatus 100 shown in FIG. 1 includes semiconductor laser element 101, DMD (Digital Mirror Device) 102, projection lens 103, DMD drive unit 104, drive unit 105, light absorber 108 and determination unit 109. In FIG. 1, outlined arrows represent fluxes of light.

Semiconductor laser element 101 is a laser light source, and outputs laser light in accordance with supply of driving current. A plurality of semiconductor laser elements 101 are provided and connected in series.

DMD 102 modulates light output from semiconductor laser element 101 and emits the modulated light. Specifically, DMD 102 performs modulation by selectively reflecting the light output from semiconductor laser elements 101. DMD 102 is an example of modulation element.

Projection lens 103 projects the input light through DMD 102.

DMD drive unit 104 controls driving of DMD 102.

Drive unit 105 supplies driving current to semiconductor laser elements 101 to control driving of semiconductor laser elements 101. Further, drive unit 105 includes current detection unit 106 and switch unit 107.

Current detection unit 106 detects the current value of the driving current flowing through semiconductor laser elements 101 and outputs the detected result to determination unit 109.

Switch unit 107 turns on or off in accordance with control of determination unit 109. When switch unit 107 is on, driving current is supplied to semiconductor laser elements 101. When switch unit 107 is off, supply of driving current to semiconductor laser elements 101 is cut off.

Light absorber 108 is disposed at the position to which the emitted light from DMD is radiated when DMD 102 is in a predetermined driving state and absorbs laser light. In the following description, it is assumed that when DMD 102 is in the off state, the light output from semiconductor laser element 101 is not directed to projection lens 103 but is directed to light absorber 108 by DMD 102 as indicated by the dashed outlined arrow in FIG. 1.

Determination unit 109 causes drive unit 105 to suspend supply of driving current to semiconductor laser elements 101 in accordance with the current value of the driving current detected by current detection unit 106. Determination unit 109 also gives instructions regarding driving control of DMD 102 to DMD drive unit 104 in accordance with the current value of the driving current detected by current detection unit 106.

Next, the operation of projection type display apparatus 100 of the present exemplary embodiment will be described.

At the time of normal operation, switch unit 107 is set in the ON state (closed state). Drive unit 105 supplies driving current If in the range of the rated operation to multiple semiconductor laser elements 101 connected in series. Semiconductor laser element 101 emits light at a luminance corresponding to the amount of current of driving current If, in accordance with the supply of driving current If. DMD drive unit 104 drives DMD 102 so as to modulate the light output from semiconductor laser elements 101 in accordance with the video signal and make the modulated light incident to projection lens 103.

Current detection unit 106 detects the current value of driving current If flowing through semiconductor laser elements 101, at intervals of a predetermined time period, for example.

Determination unit 109 compares the current value of driving current If detected by current detection unit 106 with predetermined thresholds. Specifically, determination unit 109 compares the current value of driving current If with two thresholds (the first and second thresholds). The first and second thresholds have values that are greater than the range of the rated operation of the driving current and smaller than the current value (the output suspended current value) in which light output from semiconductor laser element 101 is required to be stopped because of excessive current. For example, the first and second thresholds are values smaller by amounts that are determined by taking into account the margins of overshoot of driving current If beyond the output suspended current value and noise due to static electricity etc. Here, the first threshold is smaller than the second threshold. Accordingly, the output suspended current value is greater than the second threshold, and the second threshold is greater than the first threshold.

First, determination unit 109 determines whether or not the current value of driving current If detected by current detection unit 106 is greater than the first threshold. When the current value of driving current If has been determined not to be greater than the first threshold, determination unit 109 repeats the process of comparison with the first threshold.

When the current value of driving current If has been determined to be greater than the first threshold, determination unit 109 instructs DMD drive unit 104 to turn off DMD 102. In response to the instructions from determination unit 109, DMD drive unit 104 turns off DMD 102.

When DMD 102 is turned off as described above, the light output from semiconductor laser element 101 is reflected toward light absorber 108 by DMD 102. That is, determination unit 109 controls driving of DMD 102 so that the light output from DMD 102 is not incident on projection lens 103 when driving current If that is detected by current detection unit 106 is greater than the first threshold. The light reflected toward light absorber 108 is absorbed by light absorber 108. Therefore, the light output from semiconductor laser elements 101 can be prevented from being output to the outside of projection type display apparatus 100.

When driving current If becomes equal to or lower than the first threshold within a predetermined period of time after turning off DMD 102, determination unit 109 instructs DMD drive unit 104 to turn on DMD 102. In response to the instructions from determination unit 109, DMD drive unit 104 turns on DMD 102. As DMD 102 is turned on, the light output from semiconductor laser elements 101 is reflected toward projection lens 103 by DMD 102 and projected from projection lens 103. That is, the operational state of projection type display apparatus 100 is returned to a normal operating state.

When the current value of driving current If continues being greater than the first threshold, determination unit 109 determines whether or not the current value of driving current If is greater than the second threshold.

When the current value of driving current If is determined not to be greater than the second threshold, determination unit 109 causes DMD drive unit 104 to turn off DMD 102 in succession. Here, when the current value of driving current If continues to be greater than the first threshold and equal to or lower than the second threshold for a predetermined period of time or longer, determination unit 109 turns off switch unit 107. This configuration makes it possible to prevent long continuation of the state in which projection from projection type display apparatus 100 is disabled.

When it has been determined that the current value of driving current If is greater than the second threshold, determination unit 109 causes drive unit 105 to cut the supply of driving current to semiconductor laser elements 101 as shown in the broken line in FIG. 1. For example, determination unit 109 makes drive unit 105 stop output of driving current from the current source or turn off switch unit 107. Thus, supply of driving current If to semiconductor laser elements 101 is cut off so that emission of light from semiconductor laser elements 101 is stopped.

As described above, there are cases where a time delay occurs until output of the driving current from the current source is stopped. However, in the present exemplary embodiment, at the time when the current value of the driving current becomes greater than the first threshold, the light output from semiconductor laser elements 101 is reflected by DMD 102 toward light absorber 108. Accordingly, even if a time delay takes place up to stoppage of the output of the driving current, it is possible to prevent high-power density light (unnecessary light) from being output to the outside of the projection type display apparatus.

Here, turning off switch unit 107 causes the driving circuit that supplies driving current If to semiconductor laser elements 101 to open state, hence the detected value of current detection unit 106 takes an anomaly value. When the anomaly value of detection by current detection unit 106 continues for a fixed duration, determination unit 109 stops operation of the entire driving device that supplies driving current If to semiconductor laser elements 101.

Figure 2:
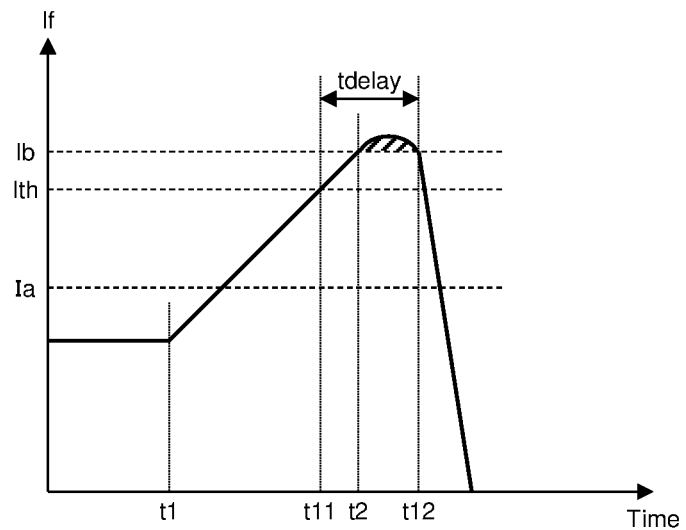
FIG. 2 is a diagram for illustrating a related method.

FIG. 2 is a diagram showing one example of change of the driving current If with time.

It is assumed that, as shown in FIG. 2, the current value of driving current If started to increase at time t1 from a smaller value than rated current Ia, and then, at time t2 the current value of driving current If reached output suspended current value Ib, and continued to take value beyond output suspended current value 1b.

In the method of stopping supply of driving current to the semiconductor laser element using a switch, as disclosed in Patent Document 1 (which will be referred to hereinbelow as the related method), in general, threshold Ith is set up so as to be smaller than output suspended current value Ib by a margin of overshoot of driving current If and noise due to static electricity etc. When the current value of driving current If becomes greater than threshold Ith, control of turning off the switch is started.

In FIG. 2, it is assumed that the current value of driving current If becomes greater than threshold Ith at time t11. In this case, in the related method, control of turning off the switch is started at time t11. In general, in control of a switch a delay time tdelay occurs from the time when control of turning off the switch is started until the time when the switch is actually turned off. Accordingly, the switch is turned off at time t12 after a lapse of delay time tdelay from time t11. Then once the switch is turned off, the current value of driving current If becomes zero.

When the event of the switch being turned off at time 12 occurs after time t2 at which the current value of driving current If reaches output suspended current value Ib, excessive current is supplied to semiconductor laser elements 101 from time t2 to time t12, as shown in FIG. 2. As a result, there is a risk that high-power density light will be emitted from semiconductor laser elements 101 and output to the outside of the projection type display apparatus.

Figure 3:
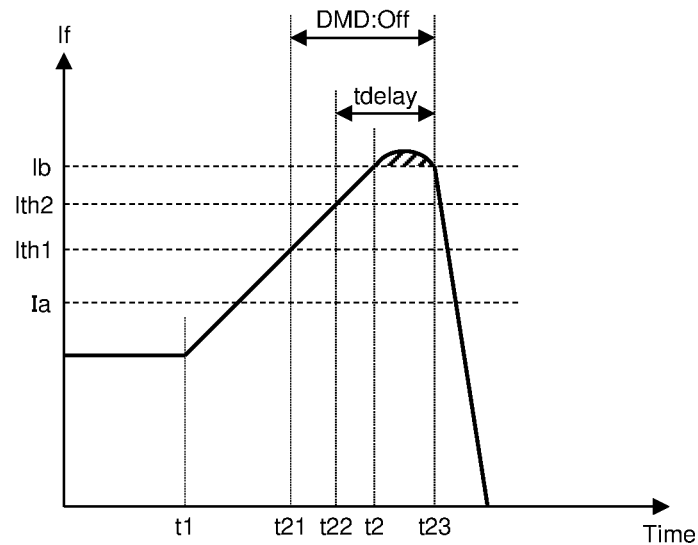
FIG. 3 is a diagram for illustrating the operation of the projection type display apparatus shown in FIG. 1.

On the other hand, in the projection type display apparatus 100 of the present exemplary embodiment, as shown in FIG. 3 the current value of driving current If is compared with two thresholds (first threshold Ith1 and second threshold Ith2). Here, description will be made with reference to FIG. 3, taking an example where switch unit 107 is turned on and off. Further, in FIG. 3, similarly to FIG. 2 it is assumed that the current value of driving current If starts to increase at time t1 from a smaller value than rated current Ia. Then, it is assumed that at time t2 the current value of driving current If has reached output suspended current value Ib, then continues to take value exceeding output suspended current value 1b.

In the present exemplary embodiment, first, determination unit 109 determines whether or not the current value of driving current If is greater than first threshold Ith1. When the current value of driving current If becomes greater than first threshold Ith1 at time t21, determination unit 109 instructs DMD drive unit 104 to turn off DMD 102. In response to instructions from determination unit 109, DMD drive unit 104 turns off DMD 102.

When DMD 102 is turned off, the light output from semiconductor laser elements 101 is reflected toward light absorber 108 by DMD 102 and absorbed by light absorber 108. Therefore, the light output from semiconductor laser elements 101 can be prevented from being output to the outside of projection type display apparatus 100.

Here, in general, DMD 102 can perform a high speed response. Accordingly, DMD 102 can be turned off at almost the same time in response to the instructions from determination unit 109, to thereby prevent the light output from semiconductor laser elements 101 from being given off to the outside of projection type display apparatus 100.

When the current value of driving current If becomes equal to or lower than first threshold Ith1 within a predetermined period of time after turning off DMD 102, determination unit 109 instructs DMD drive unit 104 to turn on DMD 102. In response to the instructions from determination unit 109 DMD drive unit 104 turns on DMD 102. As DMD 102 is turned on, the light output from semiconductor laser elements 101 is reflected toward projection lens 103 by DMD 102 and projected from projection lens 103. That is, the operational state of projection type display apparatus 100 is returned to a normal operating state. As described above, since DMD 102 can achieve a high speed response, the normal operating state can be restored almost as soon as instructions are given from determination unit 109.

When the current value of driving current If continues being greater than the first threshold, determination unit 109 determines whether or not the current value of driving current If is greater than second threshold Ith2. If the current value of driving current If becomes greater than second threshold Ith2 at time t22, determination unit 109 turns off switch unit 107.

As described above, generally, there is a delay time tdelay that occurs from the start of control of turning off a switch until the switch is actually turned off. Accordingly, the switch is turned off at time t23 after a lapse of a predetermined delay time tdelay from time t22. When the switch is turned off, the current value of driving current If becomes zero.

When the event of the switch being turned off at time t23 takes place after time t2 at which the current value of driving current If reaches output suspended current value Ib, excessive current is supplied to semiconductor laser elements 101 from time t2 to time t23. As a result, high-power density light is emitted from semiconductor laser elements 101. However, in the present exemplary embodiment, DMD 102 has been turned off at time t21 so that the light output from semiconductor laser elements 101 is not given off to the outside of projection type display apparatus 100. Accordingly, it is possible to prevent the light from being output to the outside of projection type display apparatus 100 even if high-power density light is emitted from semiconductor laser elements 101. Further, since switch unit 107 is turned off as the current value of driving current If becomes greater than second threshold Ith2, it is possible to prevent excessive current from continuously flowing to semiconductor laser elements 101.

Projection type display apparatus 100 of the present exemplary embodiment includes: semiconductor laser elements 101; DMD 102 that modulates light output from semiconductor laser elements 101 and that outputs the modulated light; and projection lens 103 that projects light input via DMD 102. Projection type display apparatus 100 further includes: drive unit 105 that drives semiconductor laser elements 101 and has current detection unit 106 for detecting the current value of the current flowing through semiconductor laser elements 101; and controller 110. When the detected current value is greater than the first threshold, controller 110 controls driving of DMD 102 so that the light output from DMD 102 will not be incident on projection lens 103. When the detected current value is greater than the second threshold that is greater than the first threshold, drive unit 105 is made to cut off the supply of current to semiconductor laser elements 101.

Therefore, even if high-power density light that results from excessive current is output from semiconductor laser elements 101 due to time delay before the supply of current to semiconductor laser elements 101 is cut off, the light will not be made incident on projection lens 103. Accordingly, it is possible to reduce the possibility of the high-power density light that results from excessive current being output to the outside of projection type display apparatus 100. Further, when the current value of driving current If is greater than the first threshold and smaller than the second threshold, the driving current continues to be supplied to semiconductor laser elements 101. Accordingly, when the current value of driving current If is restored to a normal operating state from the state in which the driving current is greater than the first threshold and smaller than the second threshold, it is possible to restore the normal operation state by simply controlling driving of DMD 102. As a result, since the suspended operating state is unlikely to occur, it is hence possible to reduce the possibility of loss of convenience.

Here, the present exemplary embodiment has been described taking an example where the modulation element is a DMD. However, the modulation element is not limited to this. Liquid crystal display devices and others may be used as a modulation element.

Although the present invention has been explained with reference to the exemplary embodiment, the present invention should not be limited to the above exemplary embodiment. Various modifications that can be understood by those skilled in the art may be made to the structure and details of the present invention within the scope of the present invention.

The invention claimed is:

1. A projection type display apparatus, comprising:
a laser light source that outputs laser light in accordance with a supply of current;
a modulation element that modulates light output from the laser light source and emits the modulated light;
a projection lens that projects incident light via the modulation element;
a drive unit that drives the laser light source and includes a current detection unit for detecting a current value of the current flowing through laser light source; and
a controller that, when the current value detected by the current detection unit becomes greater than a first threshold, controls driving of the modulation element so that the light output from the modulation element will not be incident on the projection lens, and when the current value detected by the current detection unit becomes greater than a second threshold that is greater than the first threshold, causes the drive unit to cut off the supply of current to the laser light source.

2. The projection type display apparatus according to claim 1, wherein the drive unit includes a switch unit for cutting off the supply of the current to the laser light source, and
wherein the controller causes the switch unit to cut off the supply of the current to the laser light source when the current value detected by the current detection unit becomes greater than the second threshold.

3. The projection type display apparatus according to claim 1, further comprising:
a light absorber for absorbing the laser light,
wherein the controller drives the modulation element so that the light output from the modulation element is incident on the light absorber when the current value detected by the current detection unit becomes greater than the first threshold.

4. The projection type display apparatus according to claim 1, wherein the modulation element comprises a digital mirror device.

5. The projection type display apparatus according to claim 1, wherein the controller causes the drive unit to cut the supply of the current to the laser light source when the current value continues to be greater than the first threshold and equal to or lower than the second threshold for a predetermined period of time or longer.

6. The projection type display apparatus according to claim 1, wherein the drive unit includes a switch unit for cutting off the supply of the current to the laser light source.

7. The projection type display apparatus according to claim 1, wherein the controller causes the drive unit to cut off the supply of the current to the laser light source when the current value detected by the current detection unit becomes greater than the second threshold.

8. The projection type display apparatus according to claim 1, wherein, when the current value detected by the current detection unit becomes greater than the first threshold, the controller drives the modulation element such that the modulation element reflects the light output from the laser light source.

9. A method of controlling a projection type display apparatus comprising a laser light source that outputs laser light in accordance with a supply of current, a modulation element that modulates light output from the laser light source and emits the modulated light, and a projection lens that projects incident light via the modulation element, the method comprising:

detecting a current value of the current flowing through the laser light source;
 controlling driving of the modulation element so that the light output from the modulation element will not be incident on the projection lens when the current value detected by a current detection unit becomes greater than a first threshold; and
 cutting off the supply of current to the laser light source when the current value detected by the current detection unit becomes greater than a second threshold that is greater than the first threshold.

10. The method of controlling the projection type display apparatus according to claim 9, wherein the projection type display apparatus includes a switch unit for cutting off the supply of the current to the laser light source,
 the method further including causing the switch unit to cut off the supply of the current to the laser light source when the current value detected by the current detection unit becomes greater than the second threshold.

11. The method of controlling the projection type display apparatus according to claim 9, wherein the projection type display apparatus includes a light absorber for absorbing the laser light,
 the method further including driving the modulation element so that the light output from the modulation element is incident on the light absorber when the current value detected by the current detection unit becomes greater than the first threshold.

12. The method of controlling the projection type display apparatus according to claim 5, wherein the modulation element comprises a digital mirror device.

13. The method of controlling the projection type display apparatus according to claim 9, wherein the controlling comprises causing cutting the supply of the current to the laser light source when the current value continues to be greater than the first threshold and equal to or lower than the second threshold for a predetermined period of time or longer.

14. The method of controlling the projection type display apparatus according to claim 9, wherein the projection type display apparatus includes a switch unit for cutting off the supply of the current to the laser light source.

15. The method of controlling the projection type display apparatus according to claim 9, further including causing cutting off the supply of the current to the laser light source when the current value detected by the current detection unit becomes greater than the second threshold.

16. The method of controlling the projection type display apparatus according to claim 9, further comprising:
 driving the modulation element such that the modulation element reflects the light output from the laser light source when the current value detected by the current detection unit becomes greater than the first threshold.

* * * * *